United States Patent
Locker et al.

(10) Patent No.: US 8,239,860 B2
(45) Date of Patent: Aug. 7, 2012

(54) MAINTENANCE OS DETERMINING IF SYSTEM IS WITHIN DESIRED NOISE PROFILE BASED ON APPLICATION TYPE

(75) Inventors: Howard J. Locker, Cary, NC (US);
Daryl Cromer, Cary, NC (US); Randall S. Springfield, Chapel Hill, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1506 days.

(21) Appl. No.: 11/394,654

(22) Filed: Mar. 31, 2006

(65) Prior Publication Data
US 2007/0234360 A1    Oct. 4, 2007

(51) Int. Cl.
G06F 9/46 (2006.01)
G06F 1/00 (2006.01)
H03B 29/00 (2006.01)

(52) U.S. Cl. .................. 718/1; 381/71.1; 713/300

(58) Field of Classification Search .......... 718/100, 718/1; 713/300; 381/71.1
See application file for complete search history.

(56) References Cited

U.S. PATENT DOCUMENTS

| | | | | |
|---|---|---|---|---|
| 5,768,604 | A * | 6/1998 | Yamazaki et al. | 713/323 |
| 6,591,198 | B1 * | 7/2003 | Pratt | 702/35 |
| 6,654,894 | B2 | 11/2003 | Kaminski et al. | |
| 7,310,738 | B2 * | 12/2007 | Bhagwath et al. | 713/300 |
| 2002/0101715 | A1 * | 8/2002 | Osecky et al. | 361/687 |
| 2003/0011984 | A1 | 1/2003 | Chu et al. | |
| 2003/0063437 | A1 | 4/2003 | Kurihara | |
| 2003/0191926 | A1 * | 10/2003 | Dobberpuhl et al. | 712/225 |
| 2004/0027799 | A1 | 2/2004 | King et al. | |
| 2004/0243405 | A1 | 12/2004 | Casparian et al. | |
| 2005/0006085 | A1 | 1/2005 | Nelson | |
| 2005/0030171 | A1 | 2/2005 | Liu et al. | |
| 2005/0081212 | A1 * | 4/2005 | Goud et al. | 718/107 |
| 2005/0166075 | A1 * | 7/2005 | Hack | 713/320 |

(Continued)

FOREIGN PATENT DOCUMENTS

JP    2000-073987    3/2000

(Continued)

OTHER PUBLICATIONS

David Hanrahan, Fan-Speed Control Techniques in PCs, Analog Dialogue, vol. 34, n. 4, 2000. Mike Chin, SlientTEK—AOpen's Mobo-Embedded Fan Controller, Slient PC Review, Dec. 29, 2002.

(Continued)

Primary Examiner — Meng An
Assistant Examiner — Brian Chew
(74) Attorney, Agent, or Firm — Ference & Associates LLC

(57) ABSTRACT

Hypervisors are a new technology in the industry that enable multiple Operating Systems to co-exist on a single client. The use of a hypervisor provides a novel approach to thermal fan control. The hypervisor is able to fire up a maintenance Operating System on demand or have it running from the powering of the computer. The maintenance Operating System continuously monitors the status of the user Operating System and determines if the system is within the desired fan noise profile by measuring noise levels using means well known in the art. If the system seems to be drifting out of the desired profile, the maintenance Operating System will determine what type of action is required and choose the most appropriate course of action. These actions can be performed by either the maintenance Operating System or the hypervisor, as appropriate.

19 Claims, 1 Drawing Sheet

U.S. PATENT DOCUMENTS

2005/0212781 A1* 9/2005 Clapper ............... 345/184
2006/0005184 A1* 1/2006 Tewari et al. ............ 718/1

FOREIGN PATENT DOCUMENTS

| JP | 2002-196841 | 7/2002 |
|---|---|---|
| TW | 480389 | 3/2002 |

OTHER PUBLICATIONS

Winbond Showcases New PC Solutions at Intel Developer's Forum, Winbond News & Events, Apr. 12, 2004.

Winbond PC & Server Solution: One Stop Shopping for PC ICs, Winbond News & Events, Oct. 13, 2003.

* cited by examiner

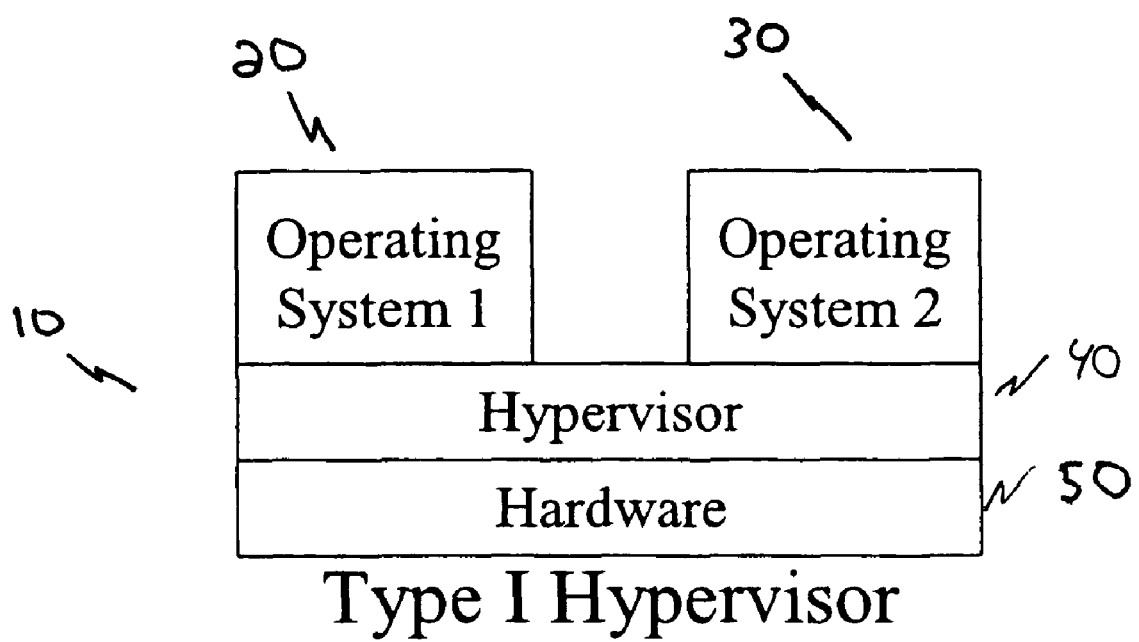

MAINTENANCE OS DETERMINING IF SYSTEM IS WITHIN DESIRED NOISE PROFILE BASED ON APPLICATION TYPE

FIELD OF THE INVENTION

The present invention relates generally to a method that uses hypervisors to provide thermal fan control for client based on user activity and application type.

BACKGROUND OF THE INVENTION

As the usage of computers becomes more widespread and the technology to produce them advances, factors that affect consumer choice are no longer limited to speed and storage space; rather, factors such as the ease of portability, durability, and aesthetic design of computers become an important factor in consumer choice of computers. The latest trend in PC development has been to reduce the size of computers. The success of this trend is evident by the new machines that are available on the market, such as Lenovo's Ultra Small Form Factor machines, and the Apple miniMAC systems.

The success of creating smaller computers has been somewhat marred by the challenge of cooling the system. These smaller computers, equipped with the latest processors (for example Intel's latest desktop processor Intel® Pentium® D processor), create significant complexity for system designers because the CPU has more wattage and expects more cooling from the system. When the Intel® Pentium® D processor was placed in systems designed for previous generation processors, the fan was forced to run at full speed to cool the system, resulting in noise-related issues.

The fans that are well-known in the art are no longer simply binary fans that either run On or Off. Rather, the fans that are well-known in the art are connected to a temperature sensor. As the system runs a high number of programs or computation-intensive programs, the system gets hotter and causes the fan to spin faster. The speed of the fans is directly proportional to the amount of air that is flowed through to cool the system. As the fans spin faster, the noise from the fans increases.

Fan noise is sometimes tolerated by a class of "power users" that expect high power and realize that workstations are noisier when running intensive applications. However, this noise is not tolerated during less intensive applications. For example, users will not accept a small form factor desktop with a screen saver running that results in fan noise that sounds like a turbo propeller.

During in-house research, Lenovo has found that certain screen savers chosen by users are as CPU intensive as complex calculations such as intensive applications like N-factorial. In response, Lenovo has introduced a "quiet mode" which limits the CPU performance to half speed, and consequently reduces the fan noise to a specified level. However, the drawback to this is a significant loss of performance. This causes a conundrum because customers do not want to lose performance for critical applications, but also do not want to deal with the noise for noncritical applications. Intel has also invested in power savings technology for mobile processors, which are significantly more expensive and offer lower performance than existing desktop processors. These prior art technologies often only detail thermal fan control based solely on temperature measurements.

Thus, there exists a need in the art for a method or system which is able to provide some thermal fan control of the computer based on user activity and application type. Such a method would ensure a more quiet and efficient fan without affecting the performance of the system for critical applications.

SUMMARY OF THE INVENTION

This present invention relates to a method for using hypervisors to provide thermal fan control based on user activity and application type. Hypervisors are a new technology in the industry that enables a capability Operating System and a maintenance Operating System to co-exist and use a single network. Hypervisors allow different operating systems to run on the same hardware concurrently. This has many advantages including resource isolation and ability to concurrently run different operating systems and associated applications. There are two main types of hypervisors. Hypervisor Type 1 is when the hypervisor runs directly on the hardware. This allows good performance in each operating system vs. type 2 hypervisor where the hypervisor runs under an existing operating system.

In summary, one aspect of the invention provides a system, the system comprising: a hypervisor that enables two operating systems to run concurrently; a capability operating system primarily utilized for user interaction; a maintenance operating system that has knowledge of the power state, user activity, and applications running on the capability operating system; an accessor which allows the maintenance operating system to access fan control logic; a monitor that monitors the status of the capability operation system to ascertain if the system is within a desired noise profile; a determiner that determines a course of action to follow if the system is not within the desired noise profile.

Another aspect of the invention provides a method, the method comprising the steps of: using a computer with a first capability operating system and a hypervisor; creating a maintenance operating system in the computer from the hypervisor that has knowledge of the power state, user activity, and applications running on the capability operating system; wherein the maintenance operating system has access to fan control logic; monitoring the status of the capability operation system to ascertain if the system is within a desired noise profile; determining a course of action to follow if the system is not within the desired noise profile.

Furthermore, an additional aspect of the invention provides a program storage device readable by machine, tangibly embodying a program of instructions executable by the machine to perform method steps, said method comprising the steps of: using a computer with a first capability operating system and a hypervisor; creating a maintenance operating system in the computer from the hypervisor that has knowledge of the power state, user activity, and applications running on the capability operating system; wherein the maintenance operating system has access to fan control logic; monitoring the status of the capability operation system to ascertain if the system is within a desired noise profile; determining a course of action to follow if the system is not within the desired noise profile.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 illustrates an example of a Type 1 Hypervisor.

DETAILED DESCRIPTION OF THE PREFERRED EMBODIMENTS

As mentioned above, the present invention relates to a method for using hypervisors to provide thermal fan control based on user activity and application type. Hypervisors are a new technology in the industry that enables a capability Operating System and a maintenance Operating System to co-exist and use a single network. Hypervisors allow different operating systems to run on the same hardware concurrently. This has many advantages including resource isolation and ability to concurrently run different operating systems and associated applications. There are two main types of hypervisors. A Type 1 Hypervisor runs directly on the hardware. Type 2 hypervisors run under an existing Operating System. Type 1 hypervisors allow good performance in each Operating System as opposed to Type 2 hypervisors.

The instant invention utilizes a Type 1 Hypervisor in a novel way to provide thermal fan control. This novel usage of a hypervisor will be detailed below in accordance with the co-existing Operating Systems. FIG. 1 details a Type 1 Hypervisor environment. Type 1 Hypervisor (item 10) environments are ideally suited for client manageability. Operating system 1 (item 20) can be the User Operating System (UOS) such as Microsoft XP. Operating System 2 (item 30) is a Service Operating System (SOS) used for client manageability such as Linux, or Microsoft Windows PE. These two Operating Systems, and the hypervisor (item 40), run on the same hardware (item 50).

In accordance with FIG. 1, a parallel could be made between the User Operating System and the capability Operating System, and between the Service Operating System and the maintenance Operating System. As is well-known in the art, the maintenance Operating System has knowledge of the power state, user activity, and applications running on the capability Operating System. In addition to this detailed knowledge, the maintenance Operating system also has access to the fan control logic. This access may be obtained either through the BIOS, or through a power management application, depending on the choice of implementation of the instant invention. The power management application allows the user to select a noise control scheme that controls the thermal fan conditions based on factors that include, but are not limited to, time of day, absolute maximum and other thresholds, or application type. A desired noise profile can also be initialized and set based on these factors that ensure that the fan noise is at desired levels. These levels may be determined by several methods, including but not limited to manufacturer choice, legislation, or agreed standards in the industry.

The maintenance Operating System continuously monitors the status of the compatibility Operating System and determines if the system is within the desired noise profile by measuring noise levels using means well known in the art, such as, but not limited to, a microphone. If the system seems to be drifting out of the desired profile, the maintenance Operating System will determine what type of action is required and choose the most appropriate course of action. These actions can be performed by either the maintenance Operating System or the hypervisor, as appropriate. Further, these actions may be performed one at a time, in conjunction with each other, or as a combination of several different actions.

These actions include, but are not limited to, the following responses. When multiple operations are running at the same time and thus causing fan noise beyond desire levels, these operations may be spread out or staggered over CPU cycles so as to lessen the noise levels. Noontime critical applications, such as background replications, virus scans, downloads, and so forth, may be suspended or canceled, or rescheduled. It could be determined that the system is in low activity mode and running noncritical applications such as screen savers, and thus the CPU is throttled. There could be other situations in which it would be most effective to throttle either the CPU, Video performance, or HDD performance.

It is to be understood that the present invention, in accordance with at least one presently preferred embodiment, includes elements which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An information handling system, the information handling system comprising:
    a processor;
    a memory containing instructions executable by the processor;
    a hypervisor that enables two operating systems to run concurrently;
    a capability operating system primarily utilized for user interaction; and
    a maintenance operating system that has knowledge of a power state, user activity, and applications running on the capability operating system, wherein the maintenance operating system is configured to determine if the information handling system is within a desired noise profile by measuring noise levels, wherein the desired noise profile is initialized and set based on a type of application running on the capability operating system, the maintenance operating system comprising:
        an accessor which allows the maintenance operating system to access fan control logic;
        a monitor that monitors a status of the capability operation system; and
        a determiner that determines a course of action to follow if the information handling system is not within the desired noise profile.

2. The information handling system of claim 1, wherein the accessor is a BIOS; the information handling system further comprising a microphone;
    wherein the maintenance operating system measures the noise levels using the microphone.

3. The information handling system of claim 1, wherein the accessor is a power management system that allows a user to select a noise control scheme that controls thermal fan conditions based on one or a combination of several factors.

4. The information handling system of claim 3, wherein the factors are time of day, thresholds, or application type.

5. The information handling system of claim 1, wherein the course of action, performed by one of the hypervisor and the maintenance operating system, comprises staggering computer operations over CPU cycles.

6. The information handling system of claim 1, wherein the course of action, performed by one of the hypervisor and the maintenance operating system, comprises suspending, canceling, or rescheduling applications.

7. The information handling system of claim 1, wherein the course of action, performed by one of the hypervisor and the maintenance operating system, comprises throttling a CPU, video performance, or HDD performance.

8. The information handling system of claim 1, wherein the course of action is performed by the hypervisor.

9. The information handling system of claim 1, wherein the course of action is performed by the maintenance operating system.

10. A method, the method comprising steps of:
using an information handling system with a capability operating system primarily utilized for user interaction and a hypervisor that enables two operating systems to run concurrently; and
creating a maintenance operating system in the information handling system from the hypervisor that has knowledge of a power state, user activity, and applications running on the capability operating system, wherein the maintenance operating system determines if the information handling system is within a desired noise profile by measuring noise levels, wherein the desired noise profile is initialized and set based on a type of application running on the capability operating system;
wherein the maintenance operating system: comprises an accessor which allows the maintenance operating system to access to fan control logic;
monitors a status of the capability operation system; and
determines a course of action to follow if the information handling system is not within the desired noise profile.

11. The method of claim 10, wherein the accessor is a BIOS; and further wherein measuring noise levels comprises measuring noise levels with a microphone.

12. The method of claim 10, wherein the accessor is a power management system that allows a user to select a noise control scheme that controls thermal fan conditions based on one or a combination of several factors.

13. The method of claim 12, wherein the factors are time of day, thresholds, or application type.

14. The method of claim 10, wherein the course of action, performed by one of the hypervisor and the maintenance operating system, comprises staggering computer operations over CPU cycles.

15. The method of claim 10, wherein the course of action, performed by one of the hypervisor and the maintenance operating system, comprises suspending, canceling, or rescheduling applications.

16. The method of claim 10, wherein the course of action, performed by one of the hypervisor and the maintenance operating system, comprises throttling a CPU, video performance, or HDD performance.

17. The method of claim 10, wherein the course of action is performed by the hypervisor.

18. The method of claim 10, wherein the course of action is performed by the maintenance operating system.

19. A program storage device readable by machine, tangibly embodying a program of instructions executable by the machine to perform steps comprising:
using an information handling system with a capability operating system primarily utilized for user interaction and a hypervisor that enables two operating systems to run concurrently; and
creating a maintenance operating system in the information handling system from the hypervisor that has knowledge of the power state, user activity, and applications running on the capability operating system, wherein the maintenance operating system determines if the information handling system is within a desired noise profile by measuring noise levels, wherein the desired noise profile is initialized and set based on a type of application running on the capability operating system;
wherein the maintenance operating system: comprises an accessor which allows the maintenance operating system to access to fan control logic;
monitors a status of the capability operation system; and
determines a course of action to follow if the information handling system is not within the desired noise profile.

\* \* \* \* \*